US011132832B2

United States Patent
Stafford et al.

(10) Patent No.: US 11,132,832 B2
(45) Date of Patent: Sep. 28, 2021

(54) AUGMENTED REALITY (AR) MAT WITH LIGHT, TOUCH SENSING MAT WITH INFRARED TRACKABLE SURFACE

(71) Applicant: Sony Interactive Entertainment Inc., Tokyo (JP)

(72) Inventors: Jeffrey R. Stafford, San Mateo, CA (US); Yutaka Yokokawa, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/555,685

(22) Filed: Aug. 29, 2019

(65) Prior Publication Data

US 2021/0065439 A1 Mar. 4, 2021

(51) Int. Cl.
*G06F 3/041* (2006.01)
*G06T 15/50* (2011.01)
*G01S 17/66* (2006.01)
*G02B 3/00* (2006.01)
*G02B 27/01* (2006.01)

(52) U.S. Cl.
CPC .............. *G06T 15/50* (2013.01); *G01S 17/66* (2013.01); *G02B 3/005* (2013.01); *G02B 3/0043* (2013.01); *G02B 27/0172* (2013.01); *G06F 3/041* (2013.01); *G06F 2203/04102* (2013.01); *G06F 2203/04104* (2013.01); *G06T 2200/24* (2013.01)

(58) Field of Classification Search
CPC ....... G06T 15/50; G01S 17/66; G02B 3/0043; G02B 3/005

USPC ......................................................... 345/173
See application file for complete search history.

(56) References Cited

U.S. PATENT DOCUMENTS

| | | | |
|---|---|---|---|
| 2001/0046035 A1* | 11/2001 | Vanderwerf | H04N 5/74 353/119 |
| 2009/0146967 A1* | 6/2009 | Ino | G02F 1/133526 345/173 |
| 2009/0160815 A1* | 6/2009 | Steer | G01S 3/782 345/173 |
| 2010/0066750 A1* | 3/2010 | Yu | H04L 67/38 345/581 |
| 2010/0079426 A1* | 4/2010 | Pance | G06T 11/001 345/207 |
| 2012/0015334 A1* | 1/2012 | Hamilton | A63B 71/0622 434/247 |

(Continued)

OTHER PUBLICATIONS

International Search Report and Written Opinion dated Sep. 29, 2020 from the counterpart PCT application PCT/US2020/048239.

*Primary Examiner* — Jonathan M Blancha
(74) *Attorney, Agent, or Firm* — John L. Rogitz

(57) ABSTRACT

A mat has an embedded array of light sensors under a micro-faceted lens array to provide an array of light intensity values for various incident angles of incident real world light. Virtual objects may be projected onto the mat and, using the information from the light sensors, virtually illuminated to match the real-world lighting environment. A touch sensor array may be embedded in the mat to allow users to interact with the virtual objects and provide other input. The surface of the micro-faceted lens array may be coated with a patterned infrared (IR) reflective coating, such that the mat passively reflects a specific band of IR wavelengths in a pattern to act as a fiducial marker.

20 Claims, 10 Drawing Sheets

(56) References Cited

U.S. PATENT DOCUMENTS

| | | | |
|---|---|---|---|
| 2012/0086345 A1* | 4/2012 | Tran | H05B 45/37 |
| | | | 315/158 |
| 2013/0076634 A1* | 3/2013 | Pedersen | G06F 3/0219 |
| | | | 345/168 |
| 2013/0141434 A1* | 6/2013 | Sugden | G06T 7/11 |
| | | | 345/426 |
| 2013/0194259 A1* | 8/2013 | Bennett | G06T 19/006 |
| | | | 345/420 |
| 2013/0335387 A1* | 12/2013 | Emerton | G02F 1/1336 |
| | | | 345/207 |
| 2014/0184496 A1* | 7/2014 | Gribetz | G02B 27/017 |
| | | | 345/156 |
| 2015/0130790 A1* | 5/2015 | Vasquez, II | G06T 19/006 |
| | | | 345/419 |
| 2015/0149902 A1* | 5/2015 | Zavesky | H04N 21/25883 |
| | | | 715/716 |
| 2016/0008718 A1* | 1/2016 | Schaerer | A63F 13/213 |
| | | | 463/34 |
| 2016/0299569 A1* | 10/2016 | Fisher | G02B 27/0172 |

\* cited by examiner

AUGMENTED REALITY (AR) MAT WITH LIGHT, TOUCH SENSING MAT WITH INFRARED TRACKABLE SURFACE

FIELD

The present application relates to technically inventive, non-routine solutions that are necessarily rooted in computer technology and that produce concrete technical improvements.

BACKGROUND

As recognized herein, for realistic representation of virtual objects in an augmented reality (AR) system, prior knowledge is needed about the direction and intensity of real-world light that falls onto the surface of where a virtual object is situated. This is needed to artificially light the virtual object to match the real-world lighting as if the virtual object was a real object receiving the light.

Furthermore, present principles understand that a user may wish to interact with virtual images/objects represented on a surface via an intuitive touch interface. For this and other reasons, virtual objects can be anchored to a real-world physical location by directly mapping locations of the virtual object to a specific location or using an offset to reference a point in the real world. Moreover, AR developers may prefer to target game and application spaces to specific volumes, so that gameplay and visual elements can be consistent. There are currently no adequate solutions to the foregoing computer-related, technological problems.

SUMMARY

In one aspect, an assembly includes at least one substrate and an array of light sensors coupled to the substrate. The array is configured to output plural values together indicating a direction at which light from a light source impinges on the substrate. The assembly also includes at least one processor and storage accessible to the at least one processor. The storage includes instructions executable by the at least one processor to present, on at least one display, at least one virtual object having emulated illumination based at least in part on the plural values output by the array of light sensors.

In some examples, the array of light sensors may be embedded in the substrate. In other examples, the array of light sensors may be supported on the substrate. The light sensors themselves may include silicon photodiodes and/or light-emitting diodes (LEDs).

If desired, the assembly may include at least one lens covering at least part of the substrate. The at least one lens may include a micro-faceted lens array and/or a lenticular lens assembly.

Additionally, in some implementations the assembly may include a touch sensor array that may be juxtaposed with the substrate to allow users to interact with virtual objects presented on the display as being juxtaposed with the substrate. Also in some implementations, the assembly may include a patterned infrared (IR) reflective coating juxtaposed with the substrate to reflect IR light from at least a first IR transmitter to at least a first IR receiver in a pattern provided to the processor as a location reference useful by the processor to render virtual objects as being on or near the substrate. Still further, in some embodiments the assembly may include IR lights (e.g., IR LEDs), and/or visible lights (e.g., red, green, blue LEDs) or a static visible printed image, to present an IR/visible light pattern so that, for example, the logo of the assembly's manufacturer along with other patterns (defining an asymmetrical layout) may be exhibited by the assembly and used as a location reference.

Additionally, in some examples the assembly may include the at least one display.

In another aspect, a method includes receiving an array of values from an array of respective light sensors on at least one mat and rendering a virtual object on a display as being illuminated based at least in part on the array of values. The virtual object may be rendered on the display based on one or more colors of light indicated in the array of values, based on one or more intensities of light indicated in the array of values, and/or based on one or more directions from which light emanates as indicated in the array of values.

In some implementations, the method may also include receiving data generated based on user input to the at least one mat and changing the rendering of the virtual object based on the data while still rendering the virtual object as being illuminated based at least in part on the array of values.

Still further, in some examples the method may include identifying a pattern of infrared (IR) light reflected off of the mat and then tracking, based on the identifying of the pattern of IR light, the location of the mat for presentation of the virtual object as appearing above or on the mat.

In still another aspect, a device includes at least one computer readable storage medium that is not a transitory signal. The at least one computer readable storage medium includes instructions executable by at least one processor to present, on an augmented reality (AR) display, at least one virtual object having an emulated location on top of a real-world surface assembly. The instructions are also executable to receive signals from plural light sensors in the real-world surface assembly and present emulated illumination on the at least one virtual object according to the signals.

In some examples, the instructions may also be executable to control the emission of infrared (IR) light from a headset comprising the AR display, identify a pattern of IR light reflected off of the real world surface assembly based on the emission of IR light, identify a current location of the real world surface assembly based on the identification of the pattern of IR light, and use the current location as a fiducial marker for presentation of the at least one virtual object at the emulated location.

Also, in some examples, the instructions may be executable to receive at least one signal from a touch sensor on the real-world surface assembly and alter the presentation of the virtual object at the emulated location based on the at least one signal from the touch sensor.

The details of the present application, both as to its structure and operation, can best be understood in reference to the accompanying drawings, in which like reference numerals refer to like parts, and in which:

DETAILED DESCRIPTION

Figure 1:
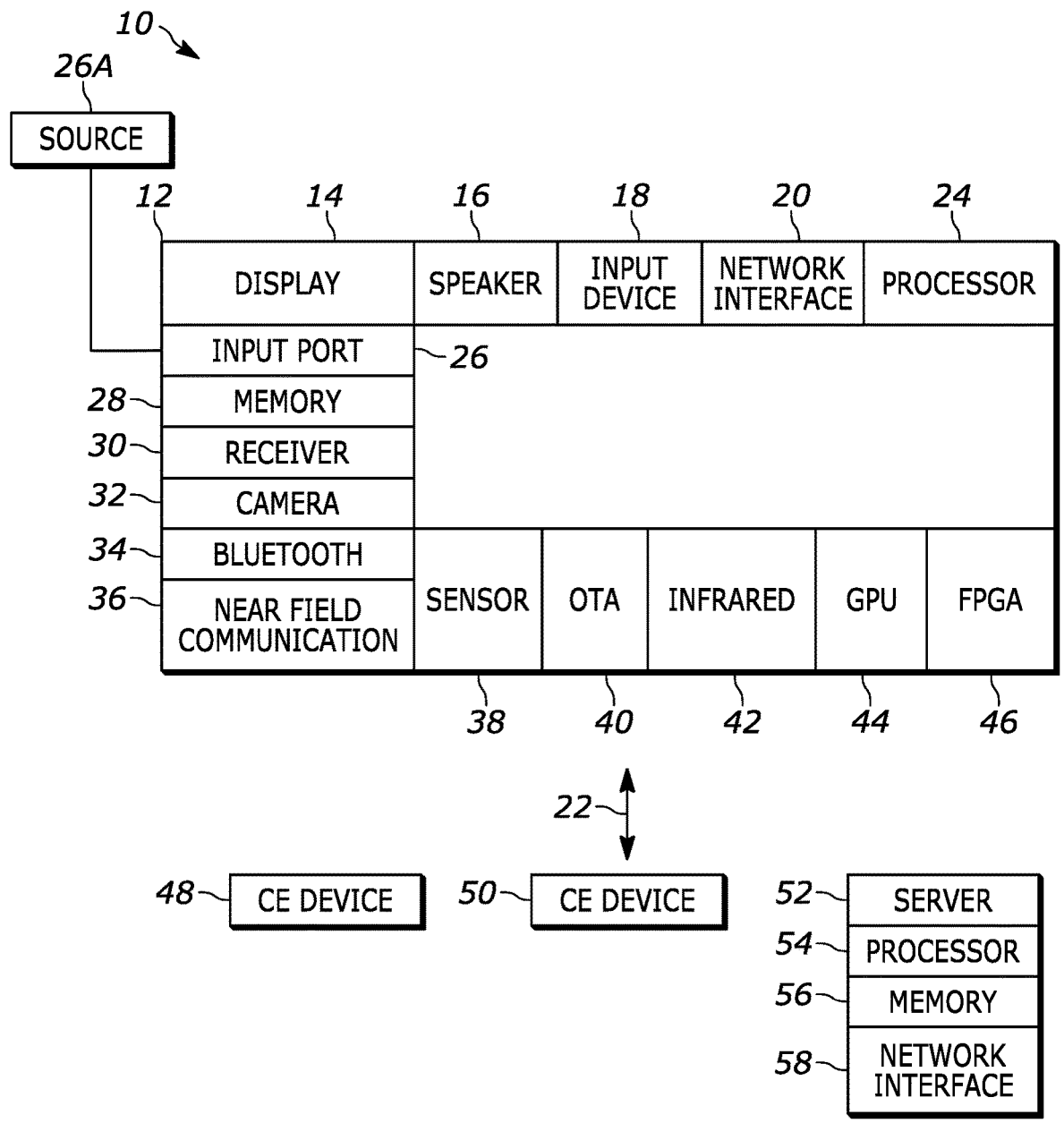
FIG. 1 is a block diagram of an example system consistent with present principles.

This disclosure relates generally to computer ecosystems including aspects of computer networks that may include consumer electronics (CE) devices. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. Note that computerized devices described in all of the figures herein may include some or all of the components set forth for various devices in FIG. 1.

The first of the example devices included in the system 10 is a consumer electronics (CE) device configured as an example primary display device, and in the embodiment shown is an audio video display device (AVDD) 12 such as but not limited to an Internet-enabled TV with a TV tuner (equivalently, set top box controlling a TV). The AVDD 12 may be an Android®-based system. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 and/or other computers described herein is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or higher flat screen and that may or may not be touch-enabled for receiving user input signals via touches on the display. The AVDD 12 may also include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may further include one or more network interfaces 20 for communication over at least one network 22 such as the Internet, an WAN, an LAN, a PAN etc. under control of one or more processors 24. Thus, the interface 20 may be, without limitation, a Wi-Fi transceiver, which is an example of a wireless computer network interface, such as but not limited to a mesh network transceiver. The interface 20 may be, without limitation, a Bluetooth transceiver, Zigbee transceiver, IrDA transceiver, Wireless USB transceiver, wired USB, wired LAN, Powerline or MoCA. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a high definition multimedia interface (HDMI) port or a USB port to physically connect (e.g. using a wired connection) to another CE device and/or a headphone port to connect headphones to the AVDD 12 for presentation of audio from the AVDD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player.

The AVDD 12 may further include one or more computer memories 28 such as disk-based or solid-state storage that are not transitory signals, in some cases embodied in the chassis of the AVDD as standalone devices or as a personal video recording device (PVR) or video disk player either internal or external to the chassis of the AVDD for playing back AV programs or as removable memory media. Also, in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 38 (e.g., a motion sensor such as an accelerometer, gyroscope, cyclometer, or a magnetic sensor, an infrared (IR) sensor for receiving IR commands from a remote control, an optical sensor, a speed and/or cadence sensor, a gesture sensor (e.g. for sensing gesture command), etc.) providing input to the processor 24. The AVDD 12 may include an over-the-air TV broadcast port 40 for receiving OTA TV broadcasts providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still further, in some embodiments the AVDD 12 may include a graphics processing unit (GPU) 44 and/or a field-programmable gate array (FPGA) 46. The GPU and/or FPGA may be utilized by the AVDD 12 for, e.g., artificial intelligence processing such as training neural networks and performing the operations (e.g., inferences) of neural networks in accordance with present principles. However, note that the processor 24 may also be used for artificial intelligence processing such as where the processor 24 might be a central processing unit (CPU).

Still referring to FIG. 1, in addition to the AVDD 12, the system 10 may include one or more other computer device types that may include some or all of the components shown for the AVDD 12. In one example, a first device 48 and a second device 50 are shown and may include similar components as some or all of the components of the AVDD 12. Fewer or greater devices may be used than shown.

The system 10 also may include one or more servers 52. A server 52 may include at least one server processor 54, at least one computer memory 56 such as disk-based or solid state storage, and at least one network interface 58 that, under control of the server processor 54, allows for communication with the other devices of FIG. 1 over the network 22, and indeed may facilitate communication between servers, controllers, and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server and may include and perform "cloud" functions such that the devices of the system 10 may access a "cloud" environment via the server 52 in example embodiments. Or, the server 52 may be implemented by a game console or other computer in the same room as the other devices shown in FIG. 1 or nearby.

The devices described below may incorporate some or all of the elements described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 2:
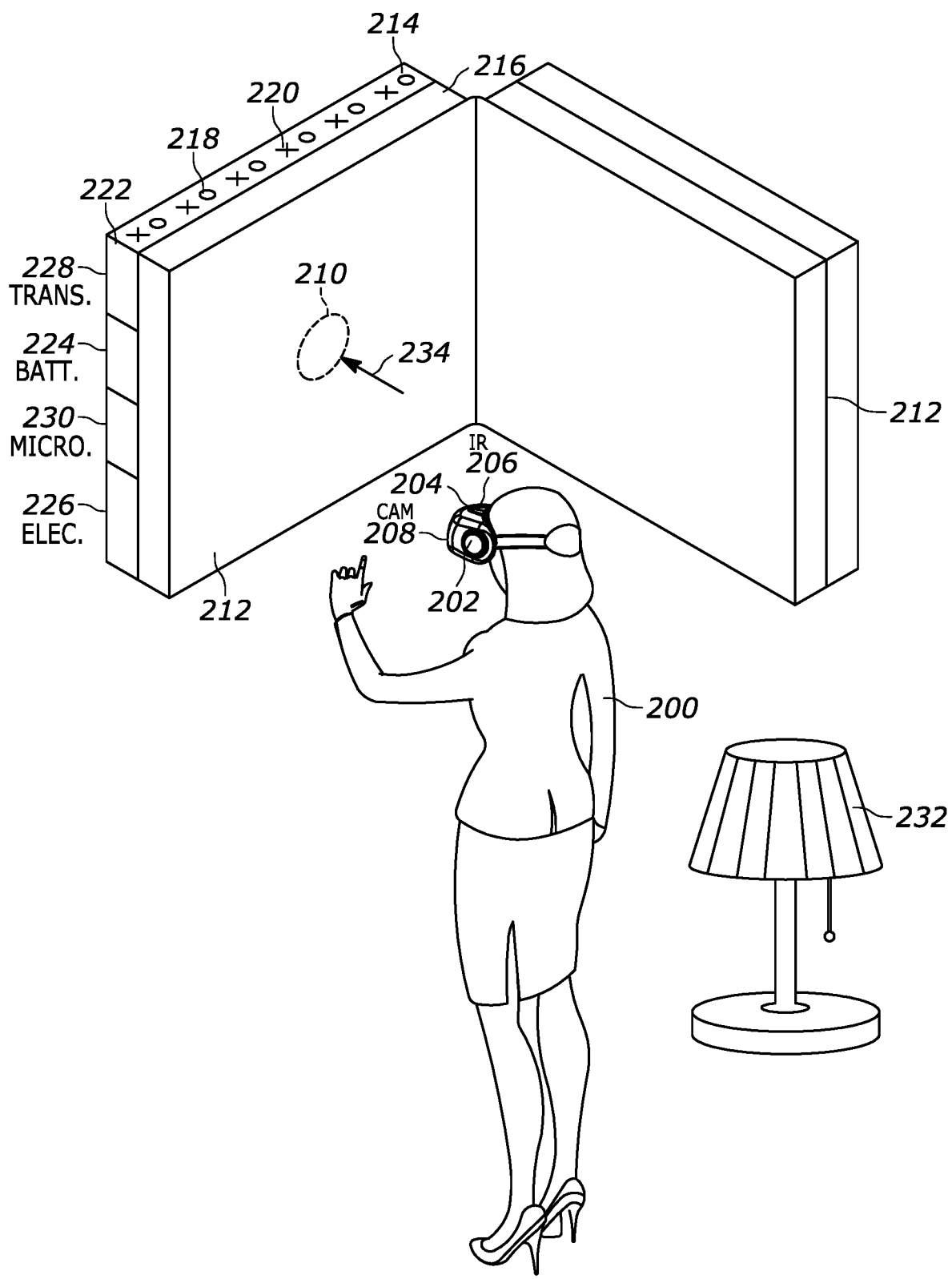
FIG. 2 is a schematic diagram of an example AR system consistent with present principles.

FIG. 2 illustrates that a user 200 may wear an augmented reality (AR) headset 202 that both enables the user 200 to see real world objects, and to present to the user virtual objects on, e.g., a display 204 of the headset 200 as may be generated by a computer simulation source such as a console or server as described above in reference to FIG. 1. The headset 200 or other component also may include one or more infrared (IR) transmitters 206 and one or more IR receivers/cameras 208 for purposes to be shortly disclosed.

One or more virtual objects 210 may be presented to the user and made to appear as if disposed on one or more real world mats 212 (two mats shown on adjoining walls in FIG. 2 for illustration). Each mat 212 may include a flexible or rigid substrate 214 with a front-facing surface covered by a micro-faceted lens array 216. Light sensors 218 such as silicon photodiodes may be embedded in or mounted to or otherwise engaged with the substrate 214, and touch sensors 220 also may be embedded in or mounted to or otherwise engaged with the substrate 214 in the form of, e.g., a capacitive or resistive touch sensor array to allow users to interact with the mat with their fingers and hands as shown. The touch sensor array may support multiple touch points and provide users a single physical area which represents an augmented display space and interaction zone for sensing user touches of the mat 212 and different pressures that might be applied as well as hovers over the mat 212 without actually making physical contact. The interaction zone may be used for the user to interact with virtual objects, for example.

It is to be understood that the components shown herein including the headset 202 and mat 212 may incorporate, in addition to the components shown, one or more of the components shown in FIG. 1 for the various electronic devices.

The substrate 214 may be flexible and may include one rigid side 222 containing one or more batteries 224 and electronics 226 for the light sensor and touch arrays 218, 220. The rigid side 222 also may support one or more transceivers 228 such as one or more wireless transceivers such as Wi-Fi or Bluetooth transceivers. One or more microprocessors 230 may be provided to execute logic described herein. The flexible portion of the mat may be rolled around the rigid portion 222 for easy transportation and storage.

Alternatively, the substrate may be implemented as a rigid, thin pad. In this configuration, the battery and electronics may be spread out under the surface of the substrate. As another alternative, the entire mat 212 may be made of flexible material and foldable or rollable like a scroll, e.g., if printed electronics and/or flexible layers are employed as well as a flexible/rollable battery "sheet". For example, printed photo diodes may be used while lenses for use consistent with present principles may be formed via a polymer film.

Completing the description of FIG. 2, one or more real world light sources 232 such as televisions, lamps, and overhead lights may illuminate the mats 212. The micro-faceted lens array 216 provides an array of light intensity onto the light sensors 218 for various incident angles of light from the source 232. In this way, the light sensors 218 gather light intensity values for various angles of real-world light at each array element.

Figure 9:
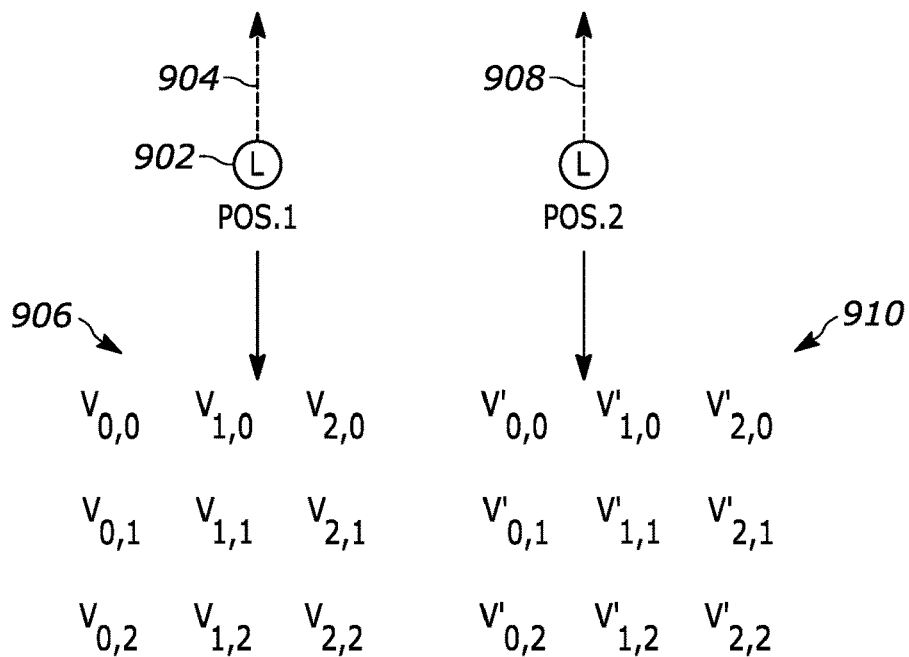
FIG. 9 is a schematic diagram illustrating an example calibration technique for the light sensor array.

For example, light impinging on a light sensor 218 at an angle of zero (0) degrees to the normal of the light sensor 218 may produce first light intensity value output by the light sensor 218, light impinging on a light sensor 218 at an angle of thirty (30) degrees to the normal in either or both x- and y-dimensions in +/−X & +/−Y directions may produce a different light intensity value output by the light sensor 218, and light impinging on a light sensor 218 at an angle of sixty (60) degrees to normal in either or both +/−X & +/−Y directions may produce still a different light intensity value output by the light sensor 218. The array of light intensity values produced by the array of sensors 218 may also indicate the direction 234 in which real world light impinges on the mat 212. Other aspects of determining light intensity and direction, as well as light temperature/color, will be disclosed below such as in reference to FIGS. 10-12. But as indicated in FIG. 2, the virtual object 210 may be rendered with shading to match the real-world lighting environment by appearing as if illuminated by a light in the real-world location of the real-world light source 232. FIG. 9 discussed further below amplifies this description.

With the above in mind, it may now be appreciated that virtual objects 210 situated in a view of the real world are made to appear as if they are on top of the mat 212 and illuminated from virtual lights of various colors in emulated locations of real world light sources of the same respective colors by using the array of directional light intensity and color values from the sensors 218 in the mat 212. This advantageously allows near-correct rendering of lighting of virtual objects 210 to match the real-world lighting environment. The mat 212 may be used by computer simulations (such as computer games) as a gameplay mechanism, asking users to illuminate virtual 3D objects with a portable flashlight, thus revealing hidden items/information for example. Furthermore, the mat 212 may provide a guaranteed, repeatable surface for AR interactions.

Figure 3:
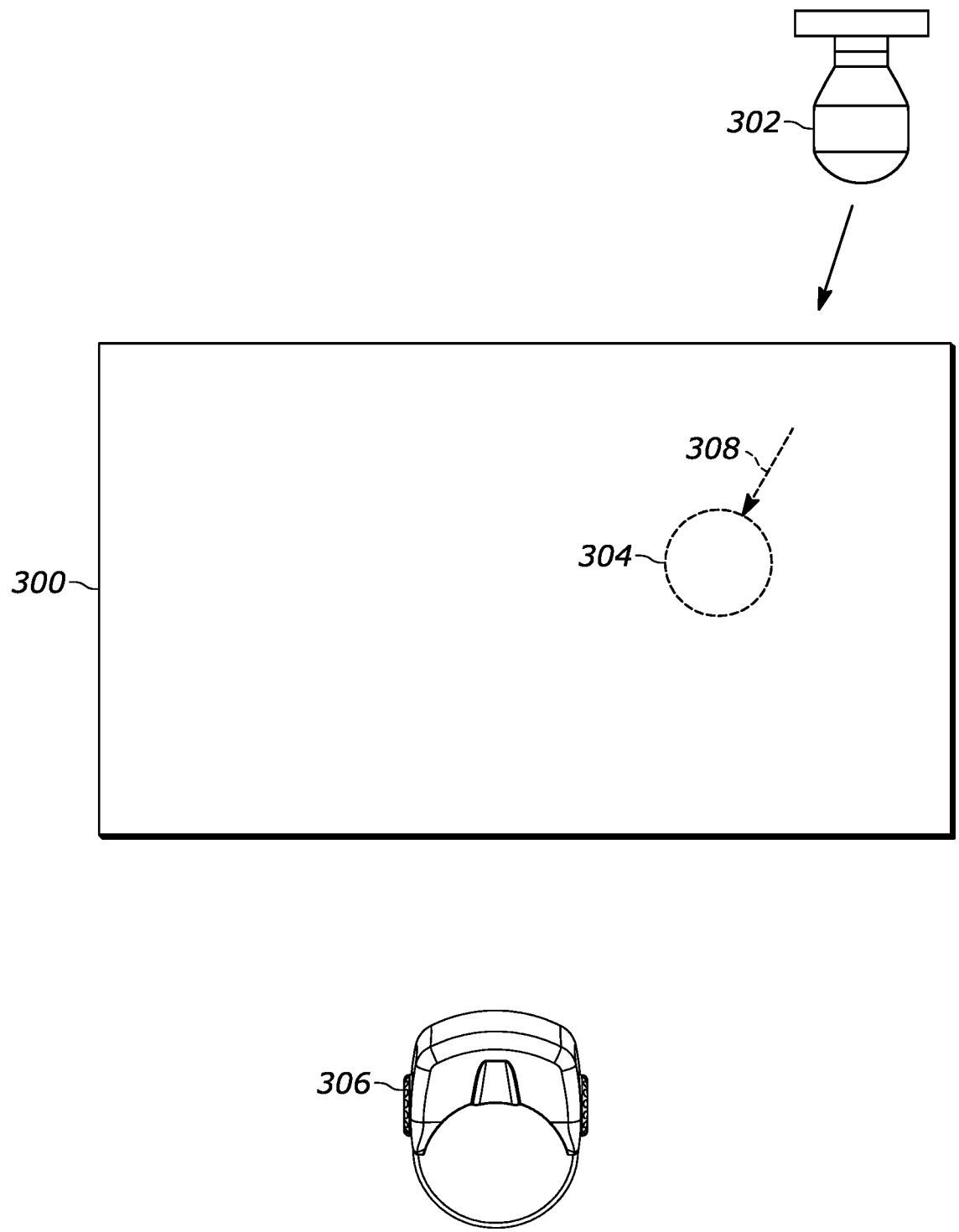
FIG. 3 is a schematic diagram of another example AR system consistent with present principles.

FIG. 3 provides another example in which a mat 300 that in all essential respects is identical to the mat 212 shown in FIG. 2 in operation and configuration may be placed on a horizontal surface such as a coffee table. The light sensors in the mat 300 can sense light intensity, direction, and color from a real world overhead ceiling light 302, allowing a virtual object 304 rendered on an AR headset 306 to appear as if the virtual object 304 were located on the mat 300 and lit from a light source projecting light in the same direction, color, and intensity as the real world light 302 (as indicated by the arrow 308).

Figure 4:
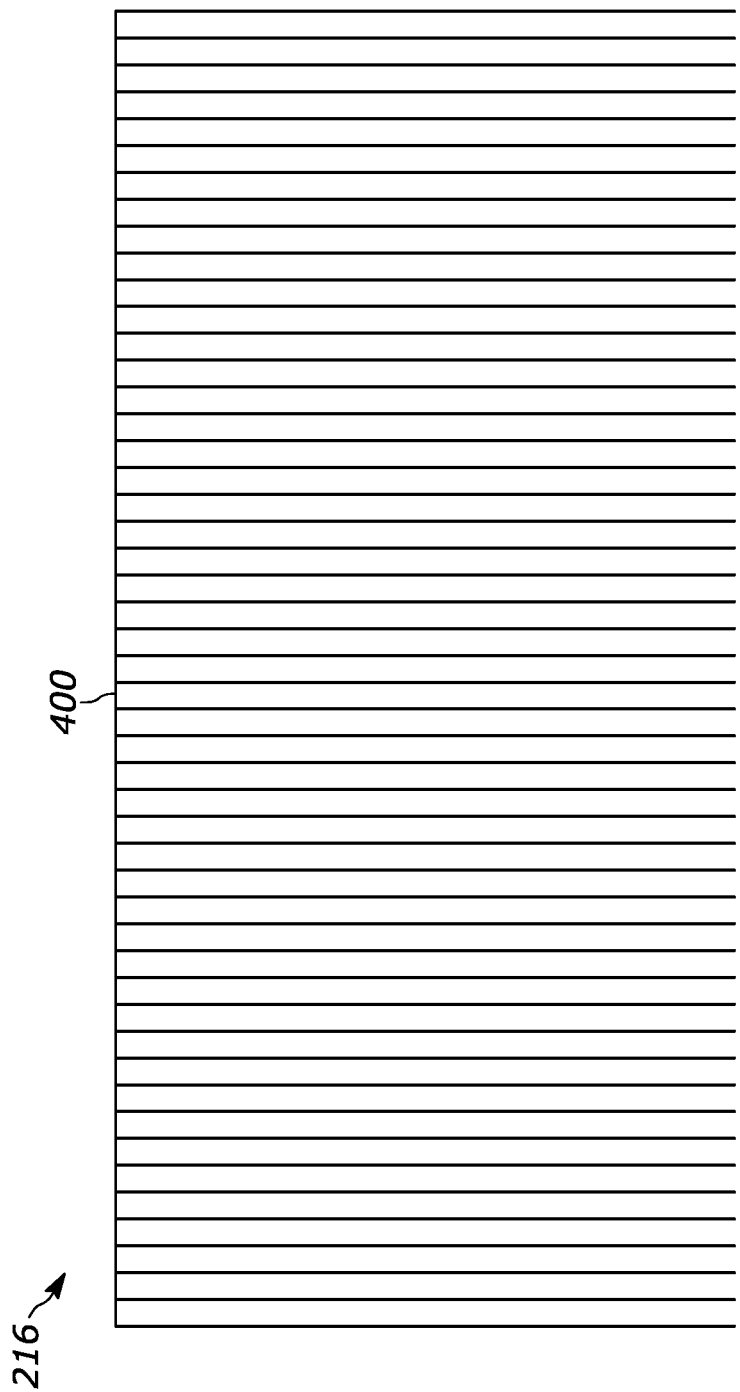
FIG. 4 is a plan view of an example lens array.

FIG. 4 illustrates a plan view of a non-limiting implementation of the micro-faceted lens array 216 in which elongated lenticular micro lenses 400 are arranged parallel to each other. Other lens arrangements and lens types may be used consistent with present principles. For example, cylindrical lenses may also be used.

Figure 5:
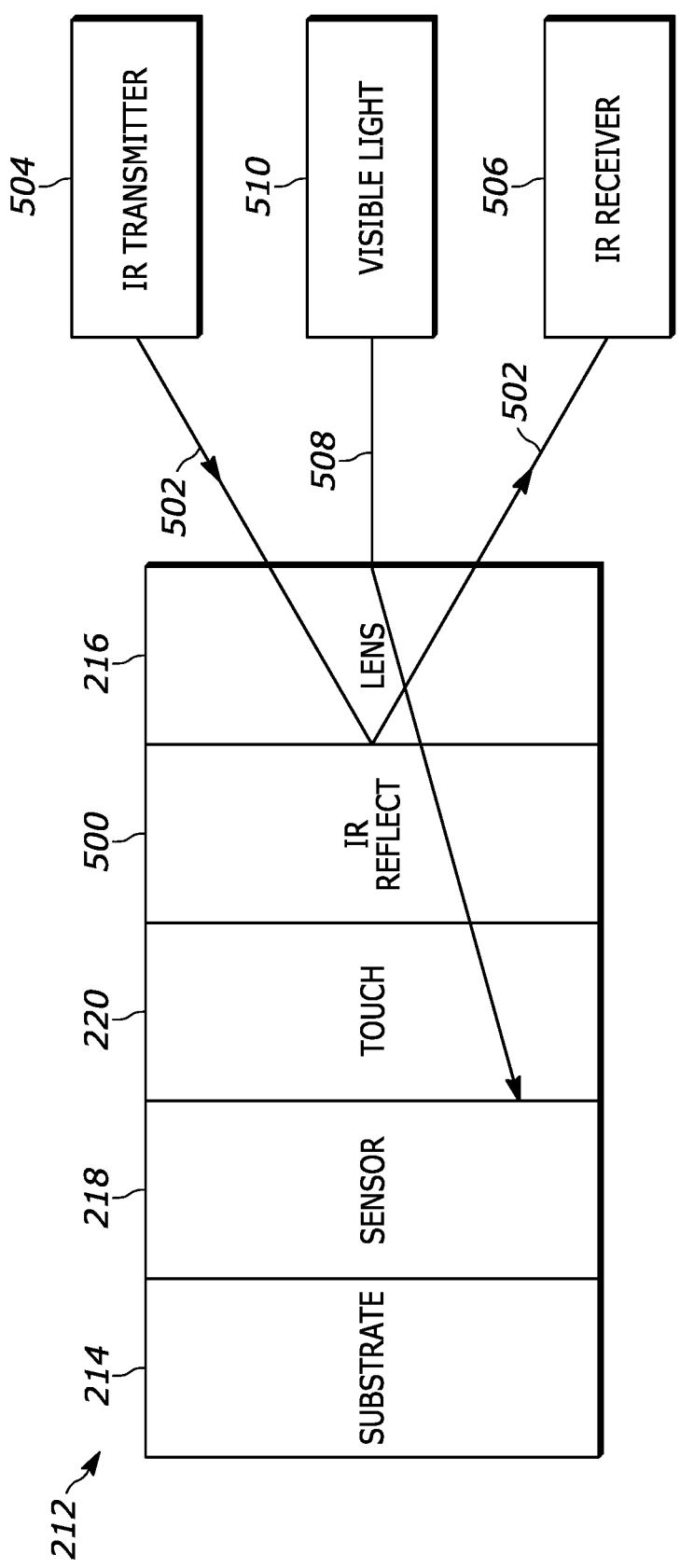
FIG. 5 is a side view of an example mat with various components consistent with present principles.

FIG. 5 provides additional illustration of example implementations of the mat 212 shown in FIG. 2. As discussed earlier, the substrate 214 has a front-facing (user-facing) surface covered by the micro-faceted lens array 216, with the light sensors 218 and touch sensors 220 being engaged with the substrate, in the non-limiting example shown, as separate layers, it being understood that the order of certain layers between the substrate 214 and lens array 216 may be reversed in some embodiments.

As shown in FIG. 5, the micro-faceted lens array 216 may be coated with a patterned IR reflective coating 500, such that the mat 212 passively reflects, as shown by the lines 502, a specific band of IR wavelengths from one or more IR transmitters 504 to one or more IR receivers 506 in a known pattern to act as a fiducial marker and prevent drift during position tracking of the AR headset 200 (e.g., during simultaneous localization and mapping (SLAM) tracking or other location tracking using a camera on the headset 200). In the example shown, the coating 500 is on the rear-facing surface of the lens array 216. In other embodiments the coating 500 may be on the front-facing (user-facing) surface of the lens array 216. However, as indicated by the line 508, visible light from a visible light source 510 passes through the IR reflective coating 500 to the light sensors 218. The IR transmitter 504 and IR receiver 506 may be located on the AR headset 200 itself, though in some embodiments they may also be located elsewhere within the environment in which the AR headset 200 is disposed.

The arrangement of FIG. 5 may be used to provide a six degree of freedom location reference of the mat 212 in relation to the AR headset 200, thus providing a physical anchor reference for virtual objects and to allow (or enhance) six degree of freedom tracking of the AR headset 200. That is, a location device (such as a global positioning satellite (GPS) receiver or other position sensor or receiver) in the headset 200 or external thereto (such as a camera in a known location imaging the headset 200) may provide the physical location of the headset 200, and information from the IR receiver 506 provides the real world physical location of various portions of the mat 212, with the real world locations of the mat 212 and headset 200 being provided to a simulation to present virtual objects in desired virtual locations on the mat 212.

Note that some embodiments may omit the micro-faceted lens array 216 and incorporate only the IR reflective coating 500, while other embodiments may incorporate both the micro-faceted lens array 216 and the IR reflective coating 500. Thus, micro-faceted lens array 216 may be a retro-reflective lens array with the IR reflective coating or film 500 underneath that is on top of the sensor array 218 as shown. In this manner, visible light 508 enters the facets of the retro reflective lens array 216, passing through the IR reflective film 500 to impinge on the light sensors 218. In contrast, IR light 502 passes through the retro-reflective lens array 216 and reflects off of the IR reflective coating or film 500 and exits at roughly the same entrance angle. The reflected IR light is detected by the IR receiver 506, which by the way of computer vision techniques is used to improve the tracking performance of the AR headset 200.

Accordingly, present principles provide a compelling hardware device to enhance the performance and features of an AR simulation system, as well as providing a standardized surface area for AR games/applications so AR simulation developers can target visual and interaction areas to the physical dimensions of the mat 212, knowing that all users with the AR system will have this space and even a certain volume above the space and its performance can be guaranteed.

Also note that if desired, the mat 212 may contain an anti-reflective internal layer to reduce visible light from reflecting off the sensors 218, thus providing a guaranteed darker area and thus background to virtual objects, therefore increasing their contrast and perceived brightness in the headset 200 and allowing developers to develop virtual objects with correct color reproduction given the color of the area. Furthermore, the external user/up-facing surface of the mat may also be of a certain uniform non-white color such as black, also for such purposes. Additionally or alternatively, an electronic ink (e-ink) display or light emitting diode (LED) display may also be included on the user/up-facing surface for such purposes so that the mat 212 may shift to a uniform non-white color for the user's AR headset 200 to render virtual objects with increased contrast and perceived brightness depending on the sensed color temperature of the room. Also in some embodiments, the color temperature of the room itself may be detected by having the display and hence top surface of the mat present a white color, and a camera calibrated for white may then be used to determine the color temperature of the room via the overall color reflecting off of the white surface.

Note that if an e-ink display is used, it may use electrophoretic technology, electrowetting technology, etc. For example, the e-ink display may be formed at least in part by a microencapsulated electrophoretic display. Further, the e-ink display may be a grayscale display, though color e-ink displays may also be used.

Also note that in some embodiments the e-ink display (or LED display) may be used to present a quick response (QR) code or logo of the manufacturer of the mat 212 to act as a fiducial marker consistent with present principles. The e-ink display or LED display may also be used for presenting buttons and other graphical objects that may be selected by a user using touch input as detected by the touch sensors 220. The buttons may be used to provide commands and other input such as to change the rendering of virtual objects (e.g., change their emulated size, orientation, etc.)

What's more, should a haptic feedback mechanism such as a vibrator be included on the mat 212, haptic feedback in the form of vibrations may emanate from the mat 212 responsive to selection of any such button.

Figure 6:
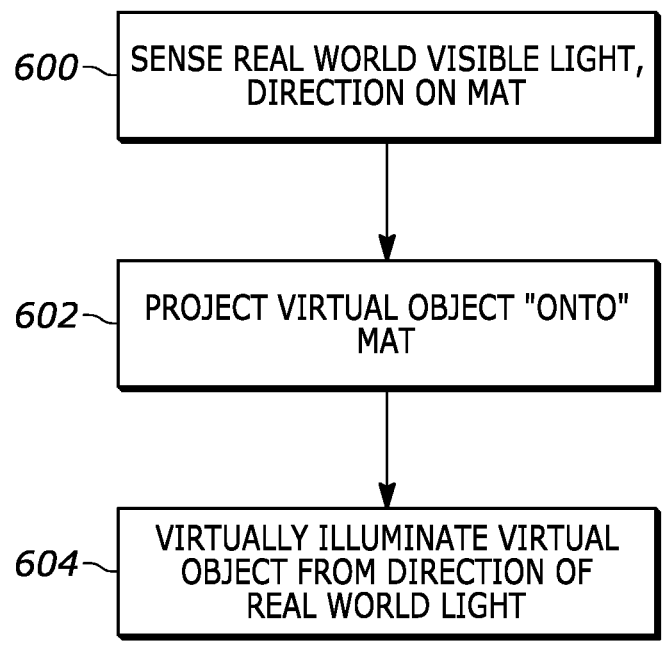
FIG. 6 is a flow chart of example overall logic consistent with present principles.

FIG. 6 illustrates logic that may be executed by one or a combination of processors such as any of the processors described herein. Commencing at block 600, real world light is sensed by the sensors 218 and owing to the lens array 216, the amount of light sensed by the sensors 218 may vary throughout the array of sensors in a way that indicates the direction of the real world light(s) relative to the sensors 218. For example, real world light sensed by the light sensors described below in reference to FIGS. 10-12 may indicate the direction of the real-world light based on which sensors sense light from various angles using respective lenses that direct light to the respective sensors from different angles. This information is provided to one or more processors executing a computer simulation which project, at block 602, one or more virtual objects onto a display such as the display 204 of the headset 200 in emulated locations that make the virtual objects appear as if they are on the mat 212.

Moving to block 604, using the information from the sensors received at block 600, the processor(s) executing the simulation may render the virtual objects "on" the mat 212 with shading and coloring as if the virtual objects were illuminated by virtual light sources located at the real world locations of the real world light sources in the same intensity, direction, and color as the real world light sources themselves.

Figure 7:
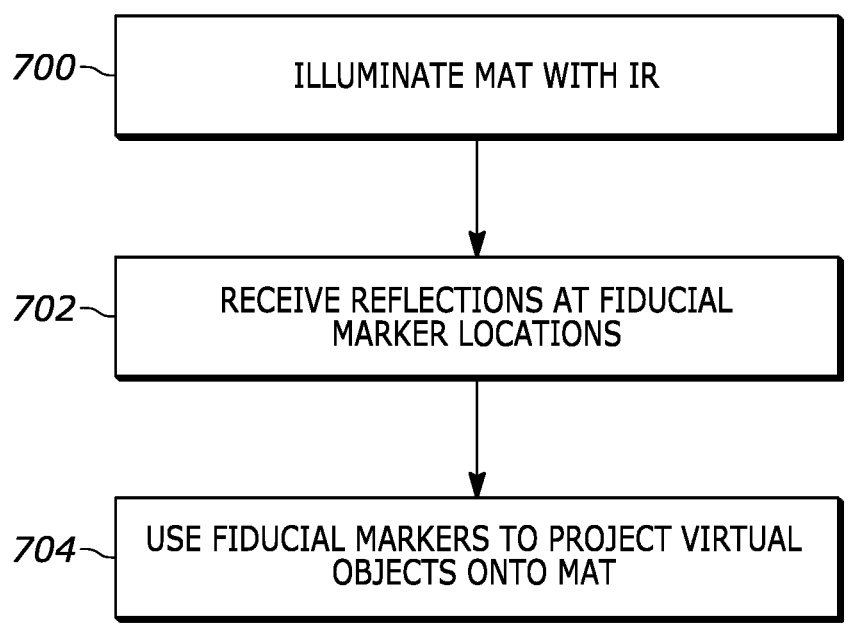
FIG. 7 is a flow chart of positioning logic consistent with present principles.

FIG. 7 illustrates further logic that may be used in connection with the IR reflective coating or film 500. Commencing at block 700, the mat 212 is illuminated with IR light. Moving to block 702, reflections of IR light from the coating or film 500 are received, and the fiducial pattern of the film 500 is detected. Essentially, positional markers are identified at block 702 by correlating the reflected pattern to locations using, e.g., a lookup table that registers respective pattern portions with respective mat locations. Proceeding to block 704, the locations identified at block 702 are used to project virtual objects as if appearing on portions of the mat 212. Essentially, the simulation developer may define where the virtual objects should appear on the mat 212 and the virtual objects are then presented on an AR display as appearing at those desired locations using the locations identified at block 702.

Figure 8:
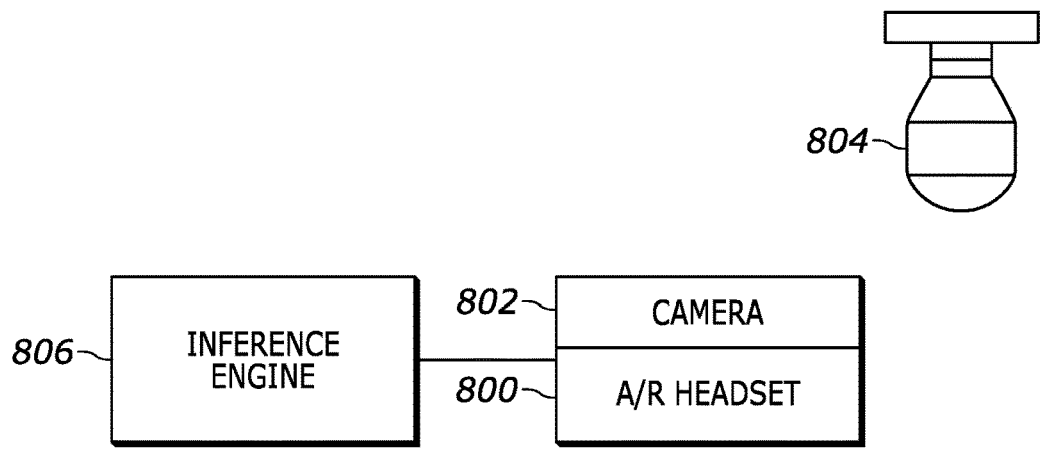
FIG. 8 is a block diagram of an alternate embodiment.

FIG. 8 illustrates an alternate or complementary embodiment in which an AR headset 800 includes a camera 802 to sense light from a source 804. The information from the camera 802 may be provided to a machine learning-based inference engine 806 to determine, using computer vision techniques, the location of the source 804 as well as its color and intensity, which may be used by a computer simulation to virtually illuminate virtual objects along the lines described above.

Referring now to FIG. 9, an array 900 of light sensors such as the light sensors 218 shown in FIG. 2 and described above is shown. For simplicity, the array 900 is a 3×3 array, it being understood that larger or smaller arrays may be used. Each sensor in the array 900 is labeled with its corresponding location in the array by a subscript indicating the column and then row of the sensor, with the first (top) row of sensors being designated in FIG. 9 the "0" row and the left-most column being designated the "0" column.

A light source 902 illuminates the array 900 to produce output signals or values in the sensors which vary depending on the location of the light source 902 relative to the array 900. The light source is moved to multiple known locations relative to the array and the values from the array are output for each location. In the example shown, for simplicity the light source 902 is shown positioned at two successive locations, it being understood that the light source 902 may be moved in both the x- and y-dimensions defined by the array 900 to more than two locations and corresponding array values recorded and correlated to the respective locations. In some examples, the light source 902 may also be moved in the z-dimension defined by the array 900 for such purposes.

Thus, in a first position the light source 902 illuminates the array 900 along a first central axis 904 of illumination. This produces a first array 906 of values, labeled "V" in FIG. 9 with subscripts corresponding to the subscripts of the respective sensors in the array 900. The light source 902 is then moved to a second position to illuminate the array 900 along a second central axis 908 of illumination. This produces a second array 910 of values, labeled "V" (or V-prime) in FIG. 9 with subscripts corresponding to the subscripts of the respective sensors in the array 900. The arrays 906, 910 of values are correlated to the known positions of the light source 902 that produced them, and during subsequent execution of a computer simulation, the simulation processor receives a current array of values from the light sensors, retrieves the stored array of values most closely matching the current array of values, and uses the stored light source position corresponding to the stored array of values most closely matching the current array of values as the location of a virtual light source. Based on the location of the virtual light source, the processor renders a virtual object on a mat described herein as being illuminated by the virtual light source emulated to be at the stored light position corresponding to the stored array of values most closely matching the current array of values.

Figure 10:
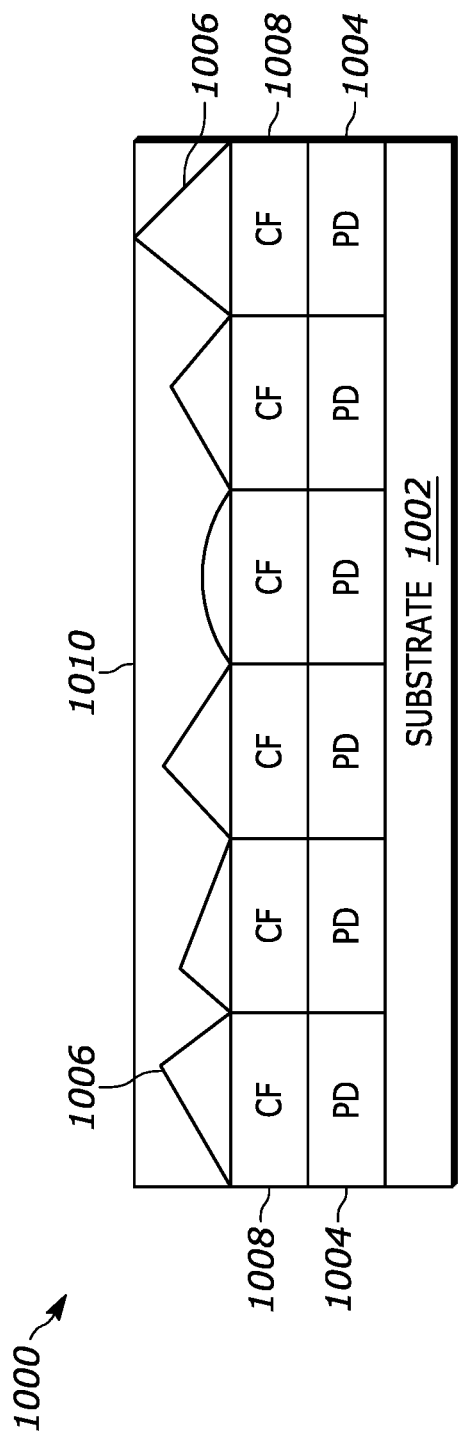
FIGS. 10-12 show side views of other example mat configurations with various components consistent with present principles.
Figure 11:
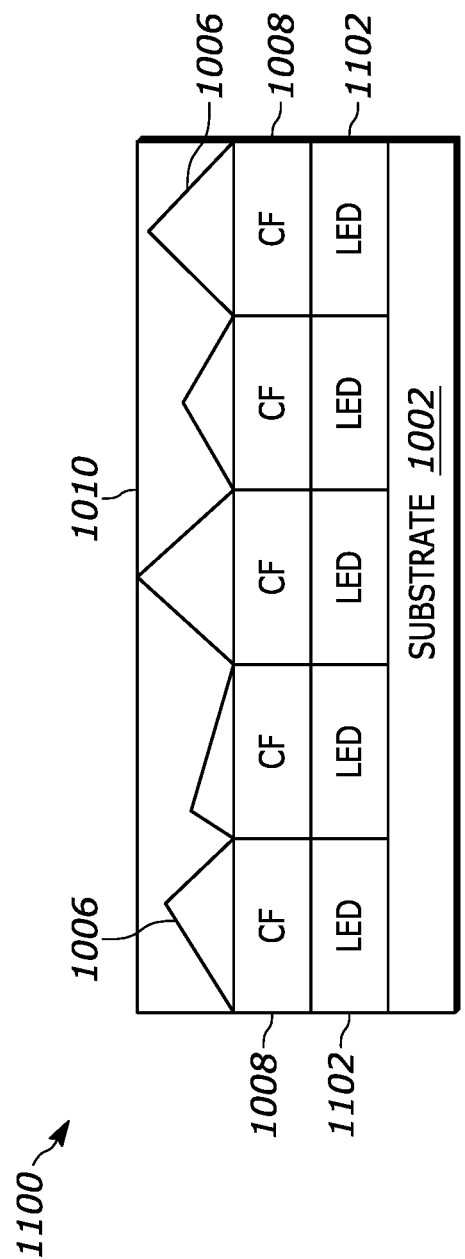
Figure 12:
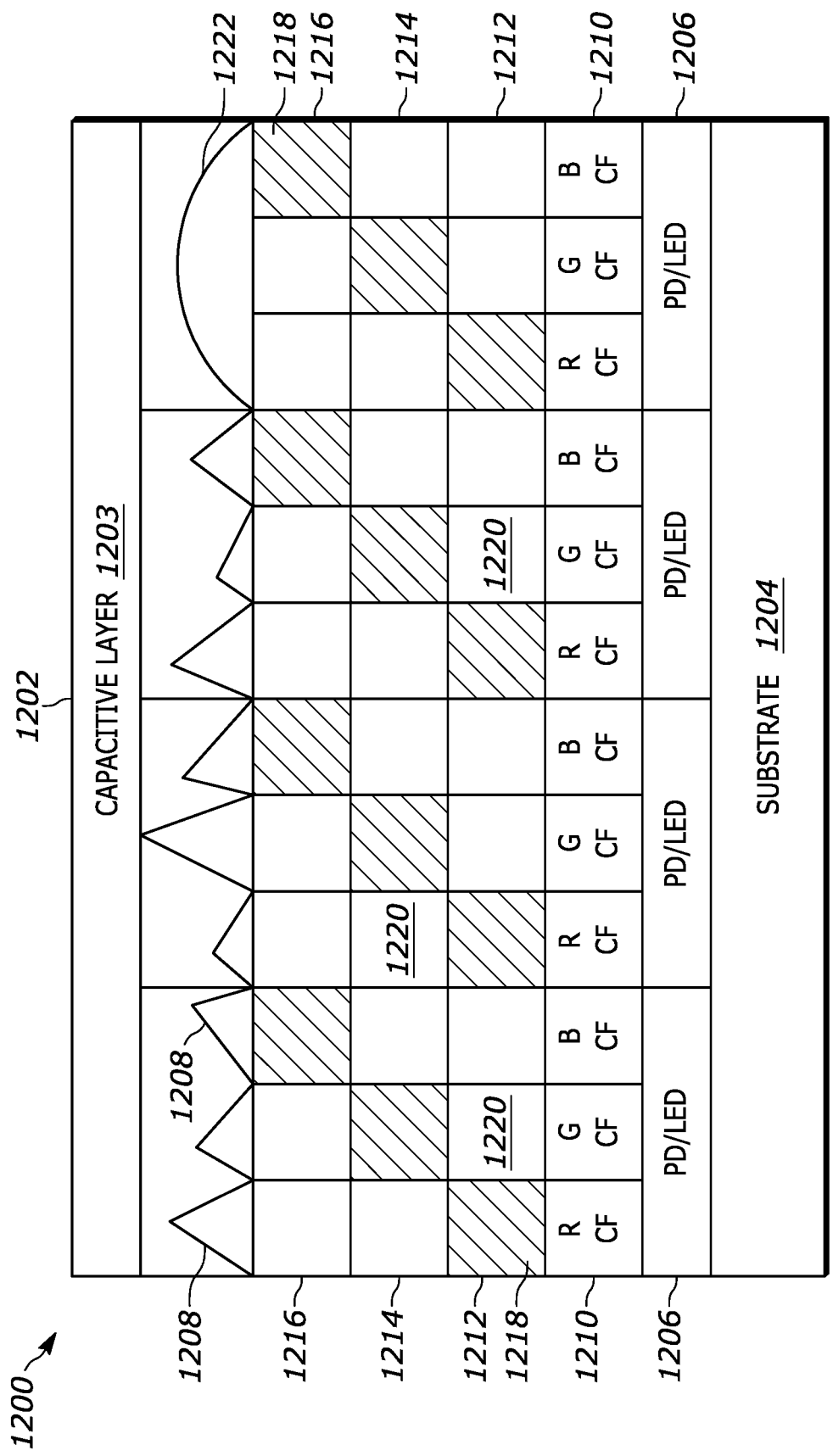

FIGS. 10-12 show various other ways in which an array of light sensors may be implemented, and the direction, intensity, and even color of real-world lighting determined consistent with present principles. The mats to be described in reference to these figures may be the same as or substantially similar to any of the mats described above, save for the differences described below.

Describing FIG. 10, a mat 1000 having a substrate 1002 is shown. Coupled to the substrate 1002 are various vertical "pixel" arrangements, with each arrangement including a respective silicon photodiode 1004 that senses light after passing through a respective lens 1006 and respective color filter 1008. Each color filter 1008 may be a red color filter, green color filter, or blue color filter. At least two of the lenses 1006 may be oriented to direct light originating from different directions and/or angles down to a respective photo diode 1004 after passing through the respective color filter 1008 for the respective pixel. In some embodiments, each lens 1006 may be oriented to direct light originating from a different direction and/or angle. Also note that a user/up-facing surface 1010 is also shown as disposed over top of the lenses 1006 and may be transparent.

Thus, each photo diode 1004 may detect light coming from a certain respective direction/angle and having a certain color based on the respective lens 1006 and respective color filter 1008 used for the respective pixel. Each of these photo diodes 1004 may be mapped in a lookup table to the respective lens direction/angle and color filter color for the pixel and then used by a device to render a virtual object consistent with present principles with emulated lighting corresponding to the sensed direction and color of real world lighting. Light intensity values output by each photo diode 1004 may also be used during such rendering to render the virtual object with emulated light intensity corresponding to the intensity of light from the real-world lighting.

FIG. 11 shows another embodiment of a mat 1100 consistent with present principles and may operate the same as the embodiment of FIG. 10 save for light-emitting diodes (LEDs) 1102 being used as light sensors for sensing light intensity rather than silicon photo diodes as shown in FIG. 10. This is possible owing to the ability of external lights to produce a detectable current in LEDs when the LEDs are not being used to emit light.

FIG. 12 shows yet another embodiment of a mat 1200 consistent with present principles. Initially, note that a user/top surface 1202 may be established by a capacitive (or resistive) touch sensing layer 1203 establishing a grid of electrodes for touch sensing consistent with present principles, such as for a user to select a button presented on the mat 1200 or to interact with a virtual object, and indeed the mats 1000 and 1100 may also include such a layer. Also note that the mat 1200 may include a substrate 1204 as with the other mats disclosed herein.

Additionally, the mat 1200 may include respective "pixel" arrangements. However, in this embodiment for each pixel, a single silicon photo diode or LED 1206 is aligned with three respective lenses 1208 configured to direct light originating from different angles than the other two lenses of the respective pixel (though in other embodiments each of the three lenses 1208 for a respective pixel may direct light originating from the same angle). For each pixel, each silicon photo diode or LED 1206 is also aligned with red, green, and blue color filters 1210 through which light may pass from a respective lens immediately above the respective filter.

Still further, each pixel may include three additional layers 1212, 1214, and 1216. Each of the layers 1212-1216 for each pixel may include one patterned liquid crystal diffuser cell 1218 and then two other transparent 1220 cells/films as shown. Each diffuser 1218 may remain in an opaque/non-light transmissive state when no current is applied but may become transparent upon current being applied to the respective layer.

Thus, each of the layers 1212-1216 may selectively have current applied to it by the mat 1200 at different times in a time-multiplexed fashion. This in turn may make one of the diffusers 1218 for each respective pixel transparent while the other two diffusers 1218 for the same pixel (but on different layers) remain opaque, thereby allowing external light to pass through a respective lens 1208 directly above the now-transparent diffuser 1218, through the respective color filter 1210 directly below with the now-transparent diffuser 1218, and to the respective silicon photo diode or LED 1206 for that pixel. In this way, not only may the respective silicon photo diode or LED 1206 output a value of light intensity but the value may also indicate a respective direction from which the light came and a color establishing at least a portion of the light based on which layer 1212-1216 was activated with current at the time of sensing and therefore which corresponding lens and color filter were used for sensing while the current was applied. The correspondence of individual layers 1212-1216 (or even individual liquid crystal diffusers 1218) to associated lens angles and color filters may be stored in a lookup table for use by a processor consistent with present principles along with the values themselves to mimic real-world lighting of a virtual object.

Further describing FIG. 12, it is to also be understood that in some examples a single lens 1222 configured to direct light from one direction/angle may be used for each pixel rather than a set of three lenses 1208. But in either case, also note that a machine learning model employing a regression neural network may be used to upsample the light field falling on the mat 1200 even though light might not have been sensed for every single position on the top surface 1202. The upsampling may occur by taking the values output from the sensors 1206 and approximating other light values for other mat surface locations using, without limitation, a regression neural network. Thus, a more-detailed light field may be determined from the "coarse" sampling by the sensors 1206. Also note that similar upsampling using a regression neural network may occur for other embodiments disclosed herein, such as those shown in FIGS. 10 and 11. Further note that the neural network may be trained based on moving a light source to different positions as described above in reference to FIG. 9 as well as a developer placing certain objects between the light source and mat to create a shadow falling at least partially over the mat for further training.

Before moving on in the detailed description, also note that in lieu of liquid crystal diffusers and color filters, a transmissive liquid crystal display with associated polarizers and its own red, green, blue color filters may also be used consistent with present principles. Further, in some embodiments only a single layer of liquid crystal cells may be used instead of the three layers 1212-1216.

Figure 13:
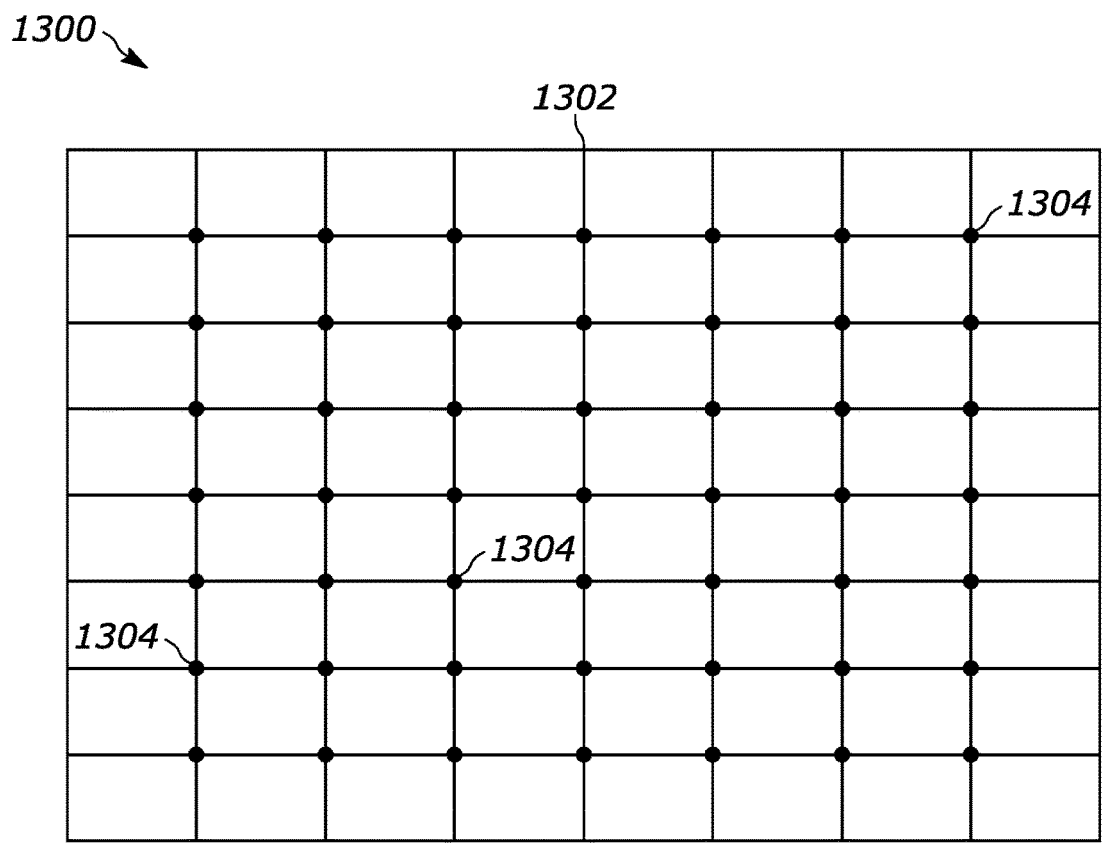
FIG. 13 shows a top plan view of a layer of a mat having light emitting diodes (LEDs) consistent with present principles.

Now describing FIG. 13, it shows a top plan view of a middle layer 1302 of a mat 1300 consistent with present principles. In some examples, capacitive or resistive touch sensors may not even be included in the mat 1300 where object location and contact with the mat 1300 may be inferred as set forth below in reference to FIGS. 13 and 14.

Specifically referring to FIG. 13, the layer 1302 may have plural LEDs 1304 arranged in grid format. And note that in addition to their use as set forth below, the LEDs 1304 may be used to sense light from various light sources, e.g., according to the embodiments of FIGS. 11 and 12 as set forth above even though in other embodiments the LEDs 1304 may only be used for sensing the position of non-light-emitting objects where other LEDs or silicon photo diodes are used for sensing light from various light sources. Therefore, depending on implementation the LEDs 1304 may be broad-spectrum LEDs capable of emitting visible red, green, blue light as well as emitting infrared (IR) light and therefore also have red, green, blue, and IR color filters. Regardless, according to FIGS. 13 and 14 the LEDs 1304 may be used for sensing the position of a physical object above, contacting, or proximate to the mat 1302 as alluded to above.

Figure 14:
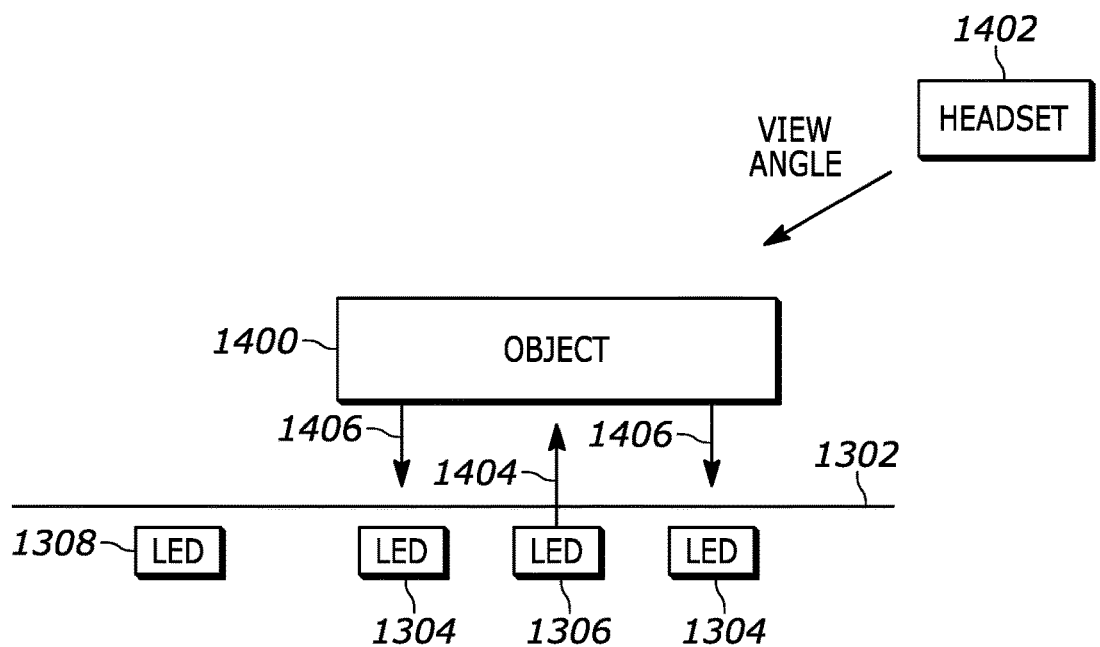
FIG. 14 is a side view block diagram of the mat having LEDs and sensing an object above the mat consistent with present principles.

Referring to FIG. 14, it shows a block diagram perspective view of some of the LEDs 1304 of FIG. 13 along with a physical object 1400 such as a user's hand hovering over but not contacting the mat 1300 while the user wears an AR headset 1402 and interacts with a virtual object presented using the headset 1402.

Cross-referencing FIGS. 13 and 14, when the object 1400 hovers over the mat 1300, one of the LEDs 1304 that is designated as LED 1306 may be activated to emit IR light while the other eight surrounding LEDs 1304 (best shown in FIG. 13) in the x-y dimension established by the layer 1302 do not concurrently emit any light. Instead of emitting light, one or more these other LEDs 1304 may sense the IR light initially emitted by the activated LED 1306 that is reflected off the object 1400 and back toward one or more of the non-activated LEDs 1304 (as represented by arrows 1404 and 1406).

In this way, the mat 1300 or another device in communication with it may use the IR light values sensed by the non-emitting LEDs 1304 to determine the location of the object 1400 in all three dimensions. The location may be determined based on time of flight for the IR light emitted from the LED 1306 to reflect off of the object 1400 and back to each respective non-emitting LED 1304 (to determine the distance(s) of various parts of the object 1400 above the mat 1300) and based on which non-activated LEDs 1304 even sense the reflection at that time or proximate times (to determine x-y coordinates for the object 1400 relative to the top surface of the mat 1300). It may also be appreciated based on the foregoing that surrounding non-activated LEDs 1304 such as the LED 1308 that may not sense IR light reflections or that sense them only after a relatively much greater length of time has passed may be used to determine that no portion of the object 1400 is hovering above the LED 1308. It should also be understood without limitation that in some implementations the determination of the location of the object 1400 could be based on just the intensity of the light that is reflected off the object 1400 onto the non-emitting LEDs such that relatively high intensity values are correlated to object location and lower intensity values are not.

Once at least part of the location of the object 1400 has been determined based on IR light emitted by the activated LED 1306, at a later time the mat 1300 may activate a different one of the LEDs 1304 while leaving surrounding LEDs 1304 inactivated to repeat the process to determine if any part of the object 1400 is hovering above those other respective LEDs 1304.

Note that machine learning and training by developers using their own hands, video game controllers, and AR headsets may even be used to configure an artificial intelligence model to accurately infer the location of the object 1400 and even shadows that such objects would cast on virtual objects presented as appearing on top of the mat 1300.

Also note that in some embodiments, the mat 1300 or a device in communication with it and receiving values of IR light sensed by the LEDs 1304 may even determine the type of object reflecting the IR light owing to the intensity of IR light as reflected off of the object 1400 and the object's distance from the mat 1300. A relational database correlating object types with values for intensity and distance may be used for such purposes.

Also, in some embodiments, input from a camera on the headset 1402 may be used to identify parts of the location of the object 1400 visible to the camera and even the object type. In this way, the input from the non-activated LEDs 1304 and the input from the camera may be used together to generate a three dimensional (3D) map or mesh of the object 1400 for use during rendering of a virtual object so that no part of the virtual object is presented as appearing behind or extending through the object 1400, e.g., as the user interacts with the virtual object with his or her hand (where the hand may be the object 1400). This may provide a more life-like view of and interaction with the virtual object, with rendering of portions of the virtual object changing to mimic being blocked from the user's view where the emulated location of those portions would correspond to real-world locations occupied by or occluded by the object 1400 from the perspective of user while wearing the headset 1402.

Further note that in addition to using LEDs such as the LEDs 1304 per FIGS. 13 and 14, ultrasonic transceivers that may be similarly situated may be used for determining the location of the object 1400 with respect to the mat 1300. An array of laser emitting diodes and time of flight sensors forming a Lidar array may also be used.

Before concluding, it is to be further understood that the mats and principles disclosed herein may be applied not just to augmented reality virtual object rendering but also to virtual reality scenarios as well as simply presenting content on a more traditional television mounted on a wall where the mat may be used, e.g., as a remote control or other input device for interacting with VR or television content.

It will be appreciated that whilst present principals have been described with reference to some example embodiments, these are not intended to be limiting, and that various alternative arrangements may be used to implement the subject matter claimed herein.

What is claimed is:

1. An assembly, comprising:
    at least one substrate;
    an array of light sensors coupled to the substrate and configured to output plural values together indicating a direction at which light from a light source impinges on the substrate;
    at least one processor comprising instructions executable by the at least one processor to:
    present, on at least one display distanced from the substrate, at least one virtual object at an emulated location on the substrate and having an emulated illumination based at least in part on the plural values output by the array of light sensors representing real world illumination at the emulated location on the substrate.

2. The assembly of claim 1, wherein the array of light sensors is embedded in the substrate.

3. The assembly of claim 1, wherein the array of light sensors is supported on the substrate.

4. The assembly of claim 1, comprising at least one lens covering at least part of the substrate.

5. The assembly of claim 4, wherein the at least one lens comprises a micro-faceted lens array.

6. The assembly of claim 4, wherein the at least one lens comprises a lenticular lens assembly.

7. The assembly of claim 1, comprising:
    a touch sensor array juxtaposed with the substrate to allow users to interact with virtual objects presented on the display as being juxtaposed with the substrate.

8. The assembly of claim 1, comprising:
    a patterned infrared (IR) reflective coating juxtaposed with the substrate to reflect IR light from at least a first IR transmitter to at least a first IR receiver in a pattern provided to the processor as a location reference useful by the processor to render virtual objects as being on or near the substrate.

9. The assembly of claim 1, wherein the light sensors comprise silicon photodiodes.

10. The assembly of claim 1, wherein the light sensors comprise light-emitting diodes (LEDs).

11. The assembly of claim 1, comprising the at least one display.

12. A method, comprising:
    receiving an array of values from an array of respective light sensors on at least one mat; and
    rendering a virtual object on a display as being illuminated as from a real world light source and as being located on the mat based at least in part on the array of values.

13. The method of claim 12, comprising:
    rendering the virtual object on the display based on one or more colors of light indicated in the array of values.

14. The method of claim 12, comprising:
    rendering the virtual object on the display based on one or more intensities of light indicated in the array of values.

15. The method of claim 12, comprising:
    rendering the virtual object on the display based on one or more directions from which light emanates as indicated in the array of values.

16. The method of claim 12, comprising:
    receiving data generated based on user input to the at least one mat; and
    changing the rendering of the virtual object based on the data while still rendering the virtual object as being illuminated based at least in part on the array of values.

17. The method of claim 12, comprising:
    identifying a pattern of infrared (IR) light reflected off of the mat; and
    tracking, based on the identifying of the pattern of IR light, the location of the mat for presentation of the virtual object as appearing above or on the mat.

18. A device, comprising:
    at least one computer readable storage medium that is not a transitory signal, the at least one computer readable storage medium comprising instructions executable by at least one processor to:
    present, on an augmented reality (AR) display, at least one virtual object having an emulated location on top of a real-world surface assembly that is distanced from the AR display;
    receive signals from plural light sensors in the real-world surface assembly; and
    present emulated illumination on the at least one virtual object according to the signals.

19. The device of claim 18, wherein the instructions are executable to:
    control the emission of infrared (IR) light from a headset comprising the AR display;
    identify a pattern of IR light reflected off of the real-world surface assembly based on the emission of IR light;
    identify a current location of the real-world surface assembly based on the identification of the pattern of IR light; and
    use the current location as a fiducial marker for presentation of the at least one virtual object at the emulated location.

20. The device of claim 18, wherein the instructions are executable to:
    receive at least one signal from a touch sensor on the real-world surface assembly; and
    alter the presentation of the virtual object at the emulated location based on the at least one signal from the touch sensor.

* * * * *